Aug. 28, 1945.　　　A. L. PARKER　　　2,383,733
TUBE STRUCTURE
Filed March 31, 1941
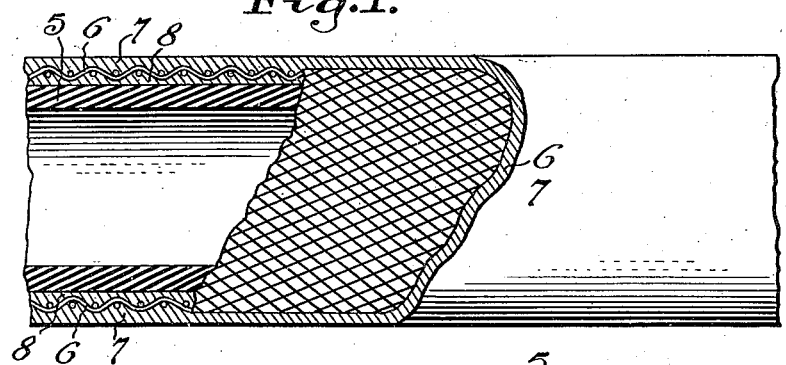
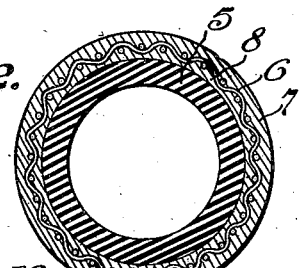
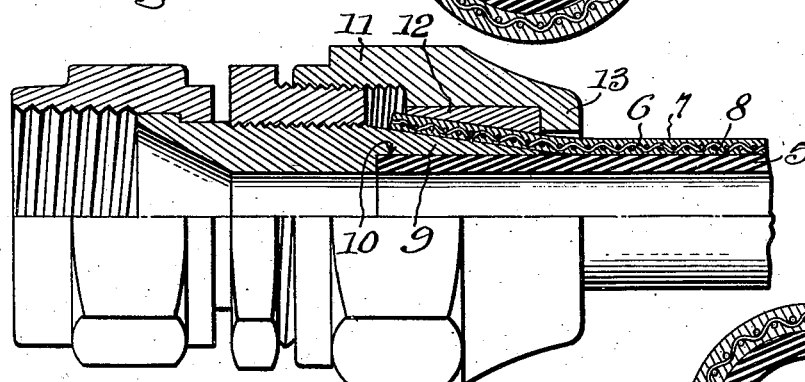
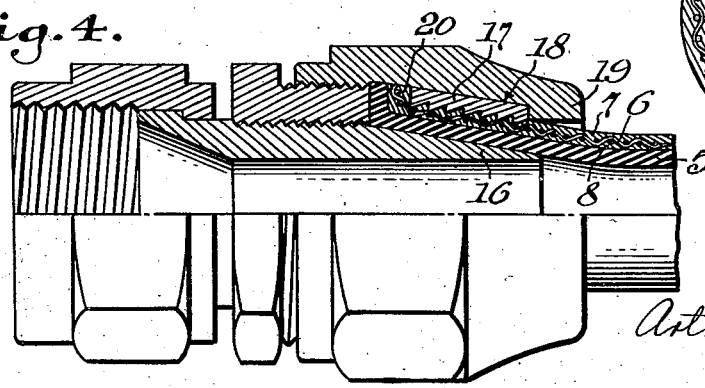
Inventor
Arthur L. Parker
By
Mason & Porter
Attorneys Patented Aug. 28, 1945

2,383,733

UNITED STATES PATENT OFFICE 2,383,733

TUBE STRUCTURE

Arthur L. Parker, Cleveland, Ohio, assignor to The Parker Appliance Company, Cleveland, Ohio, a corporation of Ohio Application March 31, 1941, Serial No. 386,211

2 Claims. (Cl. 138—55)

The invention relates generally to flexible tubing and couplings therefor, and it primarily seeks to provide a novel form of flexible tubing which is sufficiently light in weight and also strong enough for use in aircraft fuel and hydraulic systems.

At present the tubing used on hydraulic lines is usually composed of an inner liner of rubber or synthetic rubber material, an intermediate tube braided fabric, and a covering of thin rubberized fabric. The braided fabric is usually of cotton and if the tubing is to be used for high pressures, there are usually several layers of the fabric braid and there may or may not be a separate layer of rubber between each layer. Even when only one layer of fabric braid is used, there is often a second layer of rubber between the braid and the outside fabric. This results in tubing of considerably thick wall section which objectionably reduces the flexibility and increases the weight thereof. The outer fabric covering is usually either in the form of a spirally wound tape or in the form of a sheet wrapped around the tubing. In the form of spirally wound tape, the overlapping edges form a spiral ridge of appreciable size. If a sheet is wrapped around the tubing, the tubing is not perfectly round and there is a seam where the wrapping ends.

In its more detailed nature, the invention has for an object to provide a tubing structure comprising an inner tube of rubber or a suitable rubber substitute such as "neoprene," a surrounding sleeve formed of braided glass fibers, and an exterior coating of a flexible plastic which penetrates the braided glass fiber sleeve through to the inner tube and serves as a coating for the individual fibers of said braided sleeve in a manner for preventing rubbing together of these fibers during flexing of the tube structure and such as might otherwise result in severing or breakage of said fibers.

Another object of the invention is to provide a tubing structure of the character stated in which the flexible plastic used to externally coat the braided glass fiber sleeve will penetrate the interstices thereof is a material corresponding to or having an affinity for the material of the inner tube so that the tubing can be vulcanized together, thereby forming a permanent bond between the inner tube and its surrounding sleeve of coated, braided glass fibers.

With the above and other objects in view which will more fully appear, the nature of the invention will be more clearly understood by following the description, the appended claims, and the several views illustrated in the accompanying drawing.

In the drawing—

Figure 1 is a part side elevation and part central longitudinal section of a tube structure embodying the invention.

Figure 2 is a vertical cross section of the tubing structure illustrated in Figure 1.

Figure 3 is a part central longitudinal section and side elevation of a coupling adaptable for efficiently coupling the tubing structure illustrated in Figures 1 and 2.

Figure 4 is a view similar to Figure 3 illustrating a coupling adapted for efficiently coupling the tubing structure illustrated in Figure 5.

Figure 5 is a vertical cross section illustrating the modified form of tubing structure.

In the tubing structure illustrated in Figures 1 and 2 of the drawing, there is included a rubber or synthetic rubber inner tube 5 which is loosely inserted within an enclosing sleeve 6 of braided glass fibers. Over the sleeve 6 there is applied a coating of a suitable flexible plastic 7, said coating being applied in a manner for causing the plastic to penetrate the interstices of the sleeve 6 and coat the glass fibers with a thin film of the plastic. This coating reaches the inner side of the braided glass fiber sleeve, as at 8, so that said sleeve is in fact completely embedded within the thin coating of the plastic. The protective coating 7, 8 preferably comprises either a vinyl polymer or a chlorinated vinyl polymer, although other suitably flexible plastics or lacquers may be employed.

In Figure 3 of the drawing, an extremity of a tube structure such as is illustrated in Figures 1 and 2, and in which the inner tube 5 is not bonded to the surrounding sleeve structure, is shown coupled or securely clamped in a suitable form of coupling. The coupling illustrated includes a tapered male element 9 which surrounds a seat 10 for receiving the end extremity of the inner tube 5, said element 9 terminating in a relatively sharp end extremity insertible between the inner tube 5 and the surrounding sleeve structure 6, 7, 8 in the manner illustrated in Figure 3. When the female element or nut 11 of the coupling is threaded home on the male element, a flared clamp ring 12 mounted therein and engaged by the abutment shoulder 13 of the nut engages the external surface of the sleeve 6, 7, 8 and clamps the same in sealing contact against the external surface of the tapered male element extension 9. The flexible plastic 7, 8 surrounding the glass braided fibers serves to cushion the clamping pressure so that the metal seats do not shear the glass fibers. The joint is sealed against leakage by pressure of the fluid within the tube and coupling acting outwardly to press the rubber tubing 5 tightly against the seat 10.

In Figure 5 of the drawing, there is illustrated a modified form of the tubing which is particularly adaptable to use in low pressure lines, or lines which may at times be subjected to suction internally. In such lines it is preferable to bond the rubber 5 to the surrounding braided glass fiber sleeve. In this form of the invention, it is preferred that the coating material which coats the braided sleeve and forms a protective film around the individual glass fibers comprising the same shall also act as a bond to secure the inner tube and the surrounding sleeve together as at 14. When the braided glass fiber sleeve and the inner rubber tube are to be bonded in this manner, it is preferred to use but one material as the bonding agent and the protective coating. This material, designated 15, preferably comprises a cement or plastic of the type corresponding with or having an affinity for the material of the rubber tube so that the two can be vulcanized together, thus, if "neoprene" synthetic rubber is used for the tube, a "neoprene" cement may be employed as the bonding and coating agent.

The coating materials herein referred to thoroughly penetrate and form a thin film on the individual multiple fibers in the braided strands, thus when the fibers flex in the tubing while it is in service, the fibers are cushioned against direct rubbing contact one with the other, and severing or breaking of the fibers is prevented.

In Figure 4 of the drawing, there is illustrated a coupling adapted for securely clamping tube structures in which the inner tube and the surrounding, braided glass fiber sleeve are bonded. It would, of course, be possible, even in a tube thus bonded, to separate the tube and sleeve and clamp the tube extremity in the manner illustrated in Figure 3, but since this is a somewhat difficult and time consuming operation, it may be found desirable to provide a coupling of the nature illustrated in Figure 4. This coupling may be somewhat similar to the coupling of Figure 3 but in it the whole end of the tube is clamped between the tapered male element extension 16 and a split and internally ridged ferrule 17 which surrounds the tube end in opposition to the extension 16 and is forced into the tube end clamping position illustrated in Figure 4 by the inclined surface 18 and the end abutment 19 of the female element when this element is threaded home on the male element. During this clamping of the tube end, the extremity of the tube is crowded, as at 20, to additionally assure perfect sealing of the joint.

It is of course to be understood that the details of structure and arrangement of parts may be variously changed and modified without departing from the spirit and scope of my invention.

I claim:

1. A flexible tubular structure comprising an inner tube of rubber, a surrounding sleeve of braided glass fibers, and an external coating of a flexible plastic penetrating through the interstices of said sleeve and individually coating the fibers thereof and cushioning them against mutual severing contact, said penetrating coating being bonded to said inner tube.

2. A flexible tubular structure comprising an inner tube of rubber, a surrounding sleeve of braided glass fibers, and an external coating of a flexible plastic penetrating through the interstices of said sleeve and individually coating the fibers thereof and cushioning them against mutual severing contact, said plastic corresponding with or having an affinity for said rubber tube and said plastic and said rubber tube being vulcanized together.

ARTHUR L. PARKER.